(12) United States Patent
Jadeja et al.

(10) Patent No.: US 9,536,098 B2
(45) Date of Patent: Jan. 3, 2017

(54) METHODS AND SYSTEMS FOR CONCEALING INFORMATION

(71) Applicants: Dilipsinhji Jadeja, Cherrybrook (AU); Anita Jadeja, Cherrybrook (AU)

(72) Inventors: Dilipsinhji Jadeja, Cherrybrook (AU); Anita Jadeja, Cherrybrook (AU)

( * ) Notice: Subject to any disclaimer, the term of this patent is extended or adjusted under 35 U.S.C. 154(b) by 0 days.

(21) Appl. No.: 14/438,552

(22) PCT Filed: Oct. 25, 2013

(86) PCT No.: PCT/AU2013/001244
§ 371 (c)(1),
(2) Date: Apr. 24, 2015

(87) PCT Pub. No.: WO2014/063203
PCT Pub. Date: May 1, 2014

(65) Prior Publication Data
US 2015/0261967 A1    Sep. 17, 2015

(30) Foreign Application Priority Data
Oct. 25, 2012  (AU) ................................ 2012904692

(51) Int. Cl.
*H04L 9/00* (2006.01)
*G06F 21/60* (2013.01)
*H04L 9/08* (2006.01)
*G06F 21/62* (2013.01)

(52) U.S. Cl.
CPC ............. *G06F 21/602* (2013.01); *G06F 21/62* (2013.01); *H04L 9/0894* (2013.01); *H04L 2209/16* (2013.01)

(58) Field of Classification Search
CPC ....................................................... H04L 9/00
See application file for complete search history.

(56) References Cited

U.S. PATENT DOCUMENTS

| | | | |
|---|---|---|---|
| 2004/0083392 A1* | 4/2004 | Yang ...................... | G06F 21/10 726/27 |
| 2005/0091157 A1* | 4/2005 | Suzuki ................. | G06Q 20/102 705/40 |
| 2010/0030609 A1* | 2/2010 | Ramanathan .......... | G06Q 10/06 705/7.28 |

* cited by examiner

*Primary Examiner* — Josnel Jeudy
(74) *Attorney, Agent, or Firm* — Christensen Fonder P.A.

(57) ABSTRACT

A retrieving system for retrieving information concealed within a sequence of symbols. The system includes a decoder configurable using rule information and operable when so configured to retrieve the information concealed within the sequence of symbols by applying to the sequence of symbols at least one decoder rule determined by the configuration of the encoder.

16 Claims, 9 Drawing Sheets

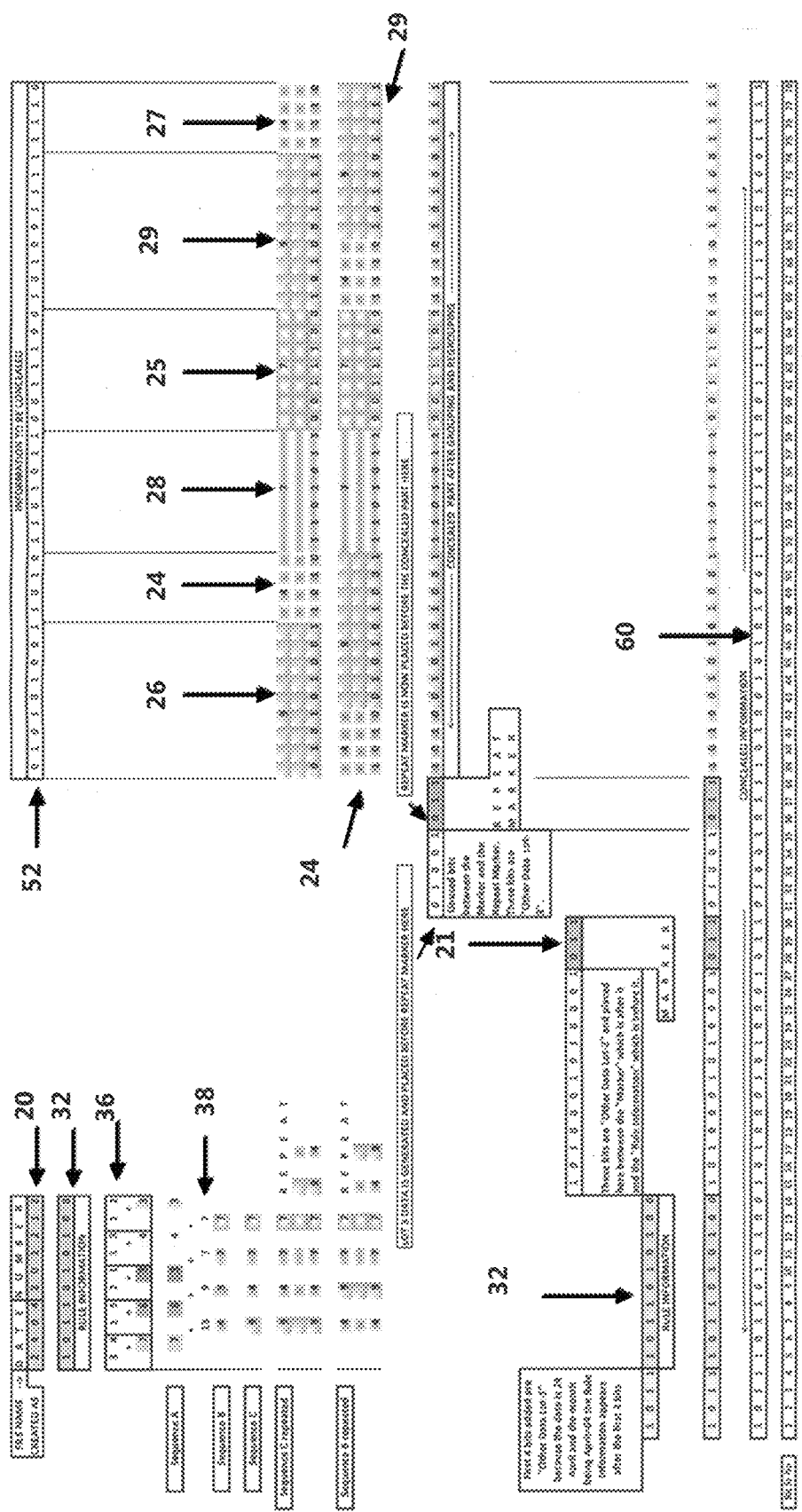

METHODS AND SYSTEMS FOR CONCEALING INFORMATION

RELATED APPLICATIONS

This present application is a National Phase entry of PCT Application No. PCT/AU2013/01244, filed Oct. 25, 2013, which claims priority to Australian Patent Application No. 2012904692, filed Oct. 25, 2012, the disclosures of which are incorporated by reference in their entirety.

TECHNICAL FIELD

Disclosed herein is a method for concealing information, a method for retrieving concealed information, a concealing system for concealing information, and a retrieving system for retrieving concealed information.

BACKGROUND

Many types of encryption require at least one key to conceal and subsequently retrieve information, for example digital information. There is a long felt need however, for a system that secures information and that provides alternatives to existing key based encryption systems.

SUMMARY

Disclosed herein is a method for concealing information comprising a sequence of symbols. The method comprises the step of obtaining rule information from a location indicated by location information obtained using a Uniform Resource Locator (URL). The method comprises the step of using the rule information so obtained to configure an encoder operable when so configured to form concealed information by applying to the information comprising the sequence of symbols at least one encoder rule determined by the configuration of the encoder.

An embodiment of the method may enable personalized concealment of information to, for example securely hold information in 'the cloud' and for personalized concealed information transfer, for example, via the internet.

The concealed information may take the form of, for example, an ordered group of symbols in which the sequence of symbols are distributed.

An embodiment comprises the step of operating the encoder on the information comprising the sequence of symbols to form the concealed information.

In an embodiment, the step of applying to the information at least one encoder rule comprises the step of grouping symbols from the sequence of symbols into a plurality of groups of symbols and changing the sequence of the plurality of groups of symbols.

In an embodiment, the step of grouping symbols comprises the step of using the rule information to determine a number of symbols in each of the plurality of groups of symbols.

In an embodiment, the step of using the rule information comprises the step of operating on symbols of rule affecting information, to obtain a plurality of group size numbers indicative of the number of symbols in each of the plurality of groups.

Generally, but not always, the rule affecting information may be a sequence of bits. The rule affecting information generally but not necessarily varies from one incident of concealment to another. Such variation may provide that the same information concealed with the same rule information and the same other rules as may be used, and provide different concealment. Rule I affecting information may be pre-shared as information or as a rule for such information. For example, rule affecting information may be the fifth word of the tenth sentence of the 5 o'clock evening news bulletin on a particular TV channel. Another example of the rule affecting information may be the series of the maximum and minimum temperature of five specific cities for the day when the concealment is/was undertaken. The rule affecting information may be retrieved from an electronic source of rule affecting information. Any mathematical or logical rule or combination thereof may be used to create a rule for creating the rule affecting information. The use of the rule affecting information is optional. In an embodiment the rule affecting information is pre-shared, as a rule for the rule affecting information, between the concealing and the retrieving systems or between the encoder and the decoder.

In an embodiment the rule affecting information may be within the file system information of a file carrying the concealed information.

In general any suitable string of symbols may be arbitrarily generated or used as the rule affecting information and it may have any arbitrary number and type of symbols suitable for use in concealing the information. Generally but not necessarily, a digital string of symbols may be used as the rule affecting information.

In an embodiment, the step of applying to the information comprising the sequence of symbols the at least one encoder rule comprises the step of joining a sequence of other symbols with the rule information.

In an embodiment, the step of joining together the rule information and the concealed information comprises the step of disposing the rule information within the other symbols.

In an embodiment, the step of applying to the information comprising the sequence of symbols at least one encoder rule comprises the step of joining the rule information and the concealed information to form transmittable concealed information for subsequent transmission to a decoder operable to retrieve the rule information from the transmittable concealed information, use the rule information to set at least one decoder rule, and subsequently retrieve the information comprising the sequence of symbols from the transmittable concealed information using the at least one decoder rule.

An embodiment comprises the step of disposing the transmittable concealed information in a file for subsequent transmission to the decoder.

In an embodiment, the location of the rule information in the joined rule information and the concealed information, is indicated by file system information of the file.

In an embodiment, the location of the rule information is indicated by location information external of the file.

In an embodiment, the location information is obtained using logic.

In an embodiment, the location information comprises at least one of time information and time derived information.

In embodiment, the location information comprises information derivable from the environment in which the decoder operates.

In an embodiment, the step of applying to the information at least one encoder rule comprises at least one of providing, posting and placing rule information, and providing, posting, placing hints and/or clues about rule information for a decoder operable to retrieve the rule information, to use the rule information to set at least one decoder rule, and subsequently retrieve the information from the concealed information using the at least one decoder rule.

In an embodiment, the logic comprises fuzzy logic.

In an embodiment, the step of determining rule information comprises the step of a rule information determiner of a processor determining the rule information, and wherein the step of using the rule information so determined to configure the encoder comprises the step of the processor using the rule information so determined to configure the encoder.

In an embodiment, the processor comprises the encoder.

Disclosed herein is a method for retrieving information concealed within a sequence of symbols. The method comprises the step of obtaining rule information from a location indicated by location information obtained using a Uniform Resource Locator (URL). The method comprises the step of using the rule information so obtained to configure a decoder operable when so configured to retrieve the information concealed within the sequence of symbols by applying to the sequence of symbols at least one decoder rule determined by the configuration of the encoder.

An embodiment comprises the step of operating the decoder on the sequence of symbols to retrieve the information within the sequence of symbols.

In an embodiment, the step of applying the at least one decoder rule comprises the step of grouping symbols from the sequence of symbols into a plurality of groups of symbols and changing the sequence of the plurality of groups of symbols.

In an embodiment the step of using the rule information to determine a number of symbols in each of the plurality of groups of symbols.

In an embodiment, the step of using the rule information comprises the step of operating on symbols of rule affecting information, to obtain a plurality of group size numbers indicative of the number of symbols in each of the plurality of groups.

An embodiment comprises the step of separating the plurality of groups from a sequence of other symbols within the sequence of symbols.

In an embodiment the rule information is determined from the sequence of symbols.

In an embodiment, the location of the rule information in the sequence of symbols, is indicated by file system information of the file.

In an embodiment, the location of the rule information in the sequence of symbols is indicated by location information external of the file.

In an embodiment, the location information is obtained using logic.

In an embodiment, the location information comprises at least one of time information and time derived information.

In an embodiment, the location information comprises information derivable from the environment in which the decoder operates.

In an embodiment, the step of applying to the information at least one decoder rule comprises at least one of obtaining rule information provided, posted or placed by the concealing system'. The step of applying to the information at least one decoder rule may comprise and obtaining hints and/or clues provided, posted or placed by the concealing system about the rule information for a decoder operable to retrieve the rule information. The step of applying to the information at least one decoder rule comprise using the rule information to set at least one decoder rule. The step of applying to the information at least one decoder rule may comprise subsequently retrieving the information from the concealed information using the at least one decoder rule.

In an embodiment, the logic comprises fuzzy logic.

In an embodiment, the step of determining rule information comprises the step of a rule information determiner of a processor determining the rule information, and wherein the step of using the rule information so determined to configure the decoder comprises the step of the processor using the rule information so determined to configure the decoder.

In an embodiment, the processor comprises the encoder.

Disclosed herein is a concealing system for concealing information comprising a sequence of symbols. The system comprises an encoder configurable using rule information obtained from a location indicated by location information obtained using a Uniform Resource Locator (URL) and when so configured operable to form concealed information by applying to the information comprising the sequence of symbols at least one encoder rule defined by the configuration of the encoder.

In an embodiment, the encoder comprises a symbol grouping module arranged to group symbols from the sequence of symbols into a plurality of groups of symbols and changing the sequence of the plurality of groups of symbols.

In an embodiment, the symbol grouping module is arranged to use the rule information to determine a number of symbols in each of the plurality of groups of symbols.

In an embodiment, the step of using the rule information comprises the step of operating on symbols of the rule affecting information, to obtain a plurality of group size numbers indicative of the number of symbols in each of the plurality of groups.

In an embodiment, the joining module is arranged to put a sequence of other symbols together with the information comprising a sequence of symbols.

In an embodiment, the joining module is arranged to dispose the rule information within the other symbols.

An embodiment comprises a joining module arranged to join the rule information and the concealed information to form transmittable concealed information for subsequent transmission to a decoder operable to retrieve the rule information from the transmittable concealed information, use the rule information to set at least one decoder rule, and subsequently retrieve the information from the transmittable concealed information using the at least one decoder rule. An embodiment comprises a file module for disposing one or more of the transmittable concealed information, the rule information and the rule affecting information in a file for subsequent transmission to and/or access by the decoder.

In an embodiment, the file module is arranged to indicate the location of the rule affecting information in file system information of the file.

An embodiment a location information module arranged to obtain the location information indicative of the positions of at least one: the rule information; the rule affecting information; and at least one of the position of a hint of the position of the rule information, and a clue of the position of the rule information.

In an embodiment, the location information module is arranged to obtain the location information using logic.

In an embodiment, the location information module is arranged to derive the location information from at least one of time information and time derived information.

In an embodiment, the location information module is arranged to derive the location from the environment in which the decoder operates An embodiment comprises a processor comprising the encoder and configured to configure the encoder using the rule information. The processor may comprise a rule information determiner configured to determine the rule information, and the encoder is configurable by the processor using the rule information so determined.

Disclosed herein is a retrieving system for retrieving information concealed within a sequence of symbols. The system comprises a decoder configurable using rule information obtained from a location indicated by location information obtained using a Uniform Resource Locator (URL) and operable when so configured to retrieve the information concealed within the sequence of symbols by applying to the Sequence of symbols at least one decoder rule determined by the configuration of the encoder.

An embodiment comprises a grouping module arranged to group symbols from the sequence of symbols into a plurality of groups of symbols and changing the sequence of the plurality of groups of symbols.

In an embodiment, the grouping module is arranged to use the rule information to determine a number of symbols in each of the plurality of groups of symbols.

In an embodiment, the grouping module is arranged to operate on symbols of the rule affecting information with symbols of the sequence of symbols to obtain a plurality of group size numbers indicative of the number of symbols in each of the plurality of groups.

An embodiment comprises a separation module arranged to separate the plurality of groups from a sequence of other symbols within the sequence of symbols.

An embodiment comprises a rule information determiner arranged to determine at least one of: the rule information; and at least one of a hint of the position of the rule information and a clue of the position of the rule information.

In an embodiment, the rule information determiner is arranged to determine the rule information from the concealed information.

In an embodiment, the rule information determiner is arranged to obtain location information indicative of the location of the rule information within the concealed information, and retrieve the rule information from the concealed information using the rule information determiner.

In an embodiment, the rule information determiner is arranged to obtain location information indicative of the location of the rule information from a source external of the concealed information.

In an embodiment, the rule information determiner is arranged to obtain the rule information using logic.

In an embodiment, the rule information determiner is arranged to obtain the rule information using at least one of time information and time derived information.

In an embodiment, the rule information determiner is arranged to obtain the rule information using information derivable from the environment in which the decoder operates.

An embodiment is arranged to determine the rule information using file system information.

An embodiment comprises a processor comprising the decoder and configured to configure the decoder using the rule information. The processor may comprise a rule information determiner configured to determine the rule information, and the decoder is configurable by the processor using the rule information so determined.

Disclosed herein is processor readable tangible media including program instructions which when executed by a processor causes the processor to perform a method disclosed above.

A computer program for instructing a processor, which when executed by the processor causes the processor to perform a method disclosed above.

A concealing system defined by claim 38 wherein the logic comprises fuzzy logic.

A retrieving system defined by claim 51 wherein the logic comprises fuzzy logic.

Disclosed herein is processor readable tangible media including program instructions which when executed by a processor causes the processor to perform a method disclosed above.

Disclosed herein is a computer program for instructing a processor, which when executed by the processor causes the processor to perform a method disclosed above.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIG. 9 shows a diagram illustrating an example of an effect of the concealing system of FIG. 2 on the information.

DESCRIPTION OF EMBODIMENTS

Figure 1:
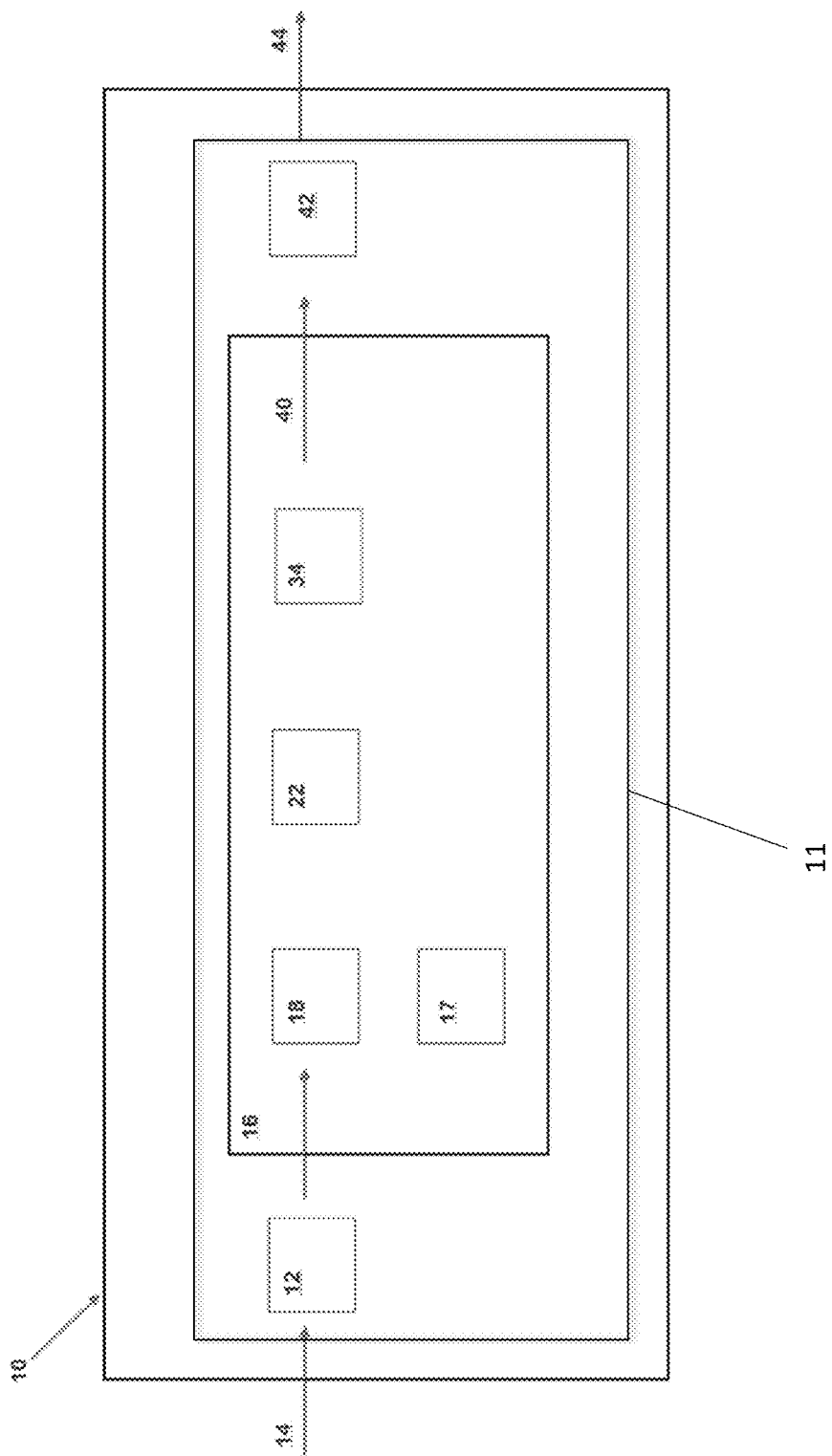
FIG. 1 shows a schematic diagram of an embodiment of a retrieving system for retrieving concealed information.

FIG. 1 shows a schematic diagram of an embodiment of a retrieving system for retrieving information concealed within a sequence of symbols, the system being generally indicated by the numeral 10. As described in further detail below, in this but not in all embodiments, the retrieving system 10 comprises a processor 11 having a microprocessor system and memory in communication with the microprocessor. The system 10 has an information receiver 12 that is arranged to receive the sequence of symbols, for example a sequence of electronically coded symbols. In this but not necessarily in all embodiments, the concealed information is in the form of a digital file, or generally any suitable form examples of which include but are not limited to, sources, places, electronic devices, computer networks, computer media, etc. The concealed information may be received via any one of, for example, an optical disk, a USB memory stick, and the Internet or any other suitable device or system. The information receiver 12 may be, for example, an electronic information receiver in the form of USB interface, an optical disk drive, a network interface in the form of, for example, a network interface card, or generally any suitable receiver. In this embodiment the sequence of symbols are binary digits, but any suitable symbols may be used, for example decimal digits, letters of the alphabet, Chinese characters, and ancient Egyptian hieroglyphics.

Figure 2:
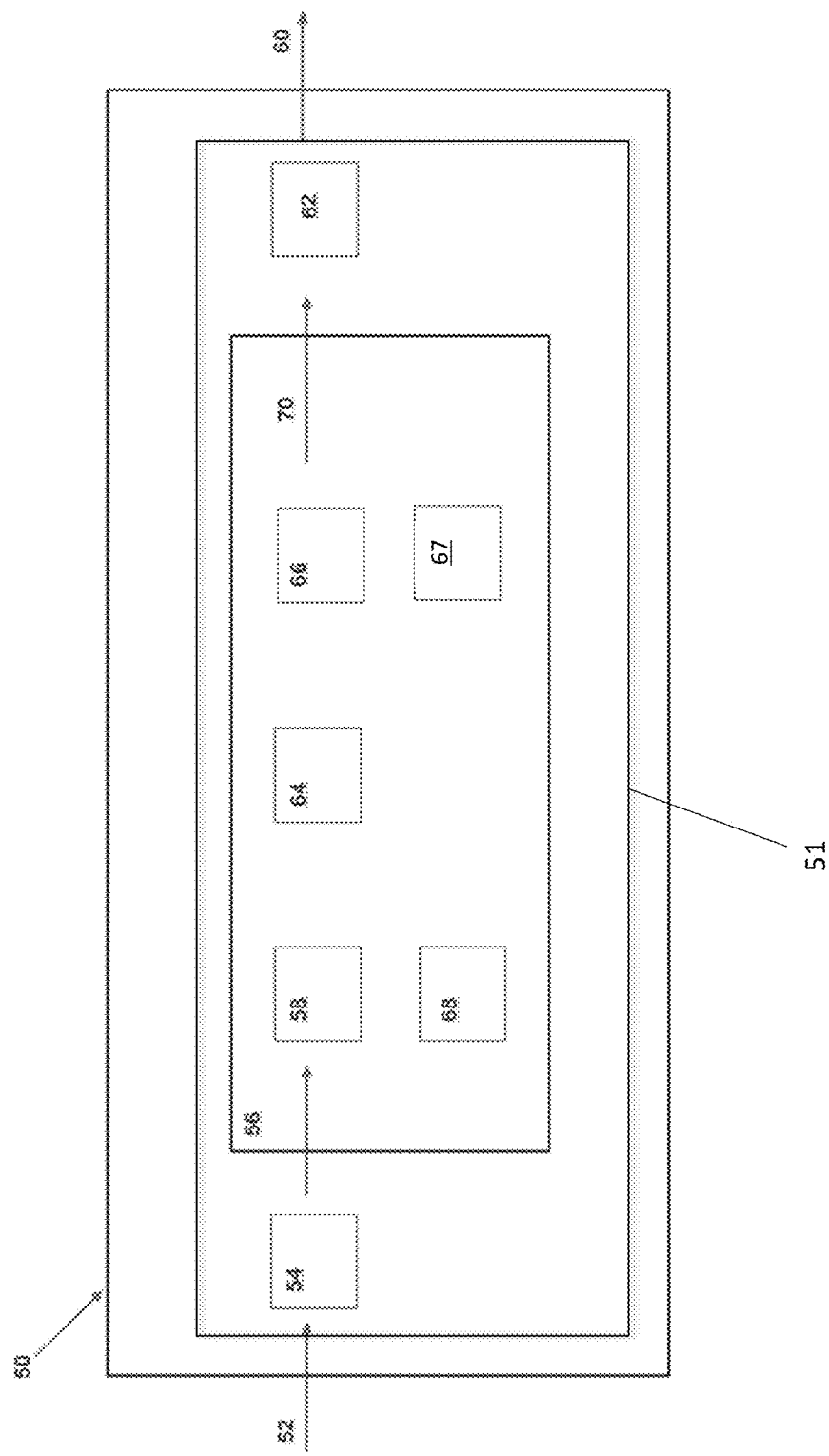
FIG. 2 shows a schematic diagram of an embodiment of a concealing system for concealing the information.

The retrieving system 10 and corresponding method may be generally operated on any concealed information, or part thereof, concealed by, for example, a concealing system 50, a schematic diagram of an embodiment of which is shown in FIG. 2. As described in further detail below, in this but not in all embodiments, the concealing system comprises a processor 51 having a microprocessor system and memory in communication with the microprocessor. The concealed information 14 (which in this but not necessary in all example is in the form of concealed digital data). The system and corresponding method may, in an embodiment, be applied to concealed information 14 as a whole or the divided parts thereof and the result suitably combined.

FIG. 3 to 7 show diagrams illustrating the effect of the retrieving system 10 on the concealed information 14.

The system 10 comprises a plurality of modules that are generally in communication with each other. The system 10 has a decoder 16 that receives the concealed information 14 from the receiver 12. The decoder 16 is configurable using decoder configuration information in the form of rule information and operable when so configured to retrieve the concealed information by applying to the concealed information at least one decoder rule determined by the configuration of the encoder. In this but not necessarily in all embodiments, the decoder 16 is self-configuring on receipt of the rule information.

The retrieving system 10 has a rule information determiner 18 that is arranged to determine the rule information. The decoder 16 may read the rules from a rule registry 17 that is in the form of volatile and/or nonvolatile memory that may be part of the encoder or system 10, for example. In this example, however, the rule information is within the concealed data 14, and comprises bits 5 to 14, counting from the left, of the concealed data (that is, the bits having sequence number 5 to 14. The rule information determiner reads the file specification 20 of the file having the concealed data, which in this case is a string of symbols "2404201212". File specification is an example of file system information. Other examples of file system information that may be used include but are not limited to file name, creation date, modification date, file size, file type. The rule information may be a set of data created by a mathematical or logical at least one rule. In this but not necessarily in all embodiments the file specification data string of "2404201212" also is rule information and demonstrates how the rule affecting information may be put to use. Generally but not necessarily, the rule affecting information, in embodiments, may be available from within (for example in some specific bit sequence), alongside (for example in the file specification of the file carrying concealed information), or outside the concealed information (for example as at an URL).

In this embodiment, the first four symbols of the file specification 20 are indicative of a file creation date (24 April) and the last six digits are indicative of a file number (201212). The rule information determiner is governed by a rule that is "the rule information is located within the received sequence of symbols and commences at the bit just after the bit with having the same sequence number as the month in the file creation date". From that rule, the rule information determiner 18 retrieves the location information indicative of the location of the rule information within the sequence of symbols. Because the month is April, which is month 4, the rule information determiner knows that the rule information 32 commences at the bit having sequence number 5 (that is, the fifth bit). The rule determiner has another rule that is "the rule information has the same number of digits as the file name".

Further examples of encoder/decoder rules may be found in the appendix. Generally, any suitable at least one rule may be used.

The decoder 16 has a grouping module 22. In this embodiment, the grouping module 22 is a symbol grouping module in the form of a digit grouping module that is arranged to group digits from the sequence of digits 14 into a plurality of groups of digits including groups indicated by numerals 24 to 29 and changing the sequence of the plurality of groups of digits. This reverses the group sequence change step of the concealing process.

The grouping module 22 is arranged to use the rule information as determined by the rule information determiner 18 to determine a number of digits in each of the plurality of groups of digits and which digits to group. The grouping module uses the rule "a marker symbol sequence is from digits 28 to 30", which returns marker sequence "011" indicated by numeral 21, and the rule "group the digits after the first repeat of the maker symbol sequence". Because the first repeat of the marker symbol sequence "011" occurs at bits 36 to 38, from the decoder rule 5 the grouping module knows that regrouping is to be done only for bits of encrypted data from digits 39 onwards up to the end of data which in this example is digit 78. Use of marker symbols in this but not necessarily all embodiments is for the purpose of obfuscation. Marker symbols may also be effectively used in some embodiments as keys that can be exchanged using any suitable key exchange mechanism. Any obfuscation rule such as the marker rule for example, may be used in some but not necessarily in all embodiments.

Following yet another rule, the grouping module 22 adds each digit of the file specification 20 to a corresponding digit of a rule information 32 to obtain a clue in the form of sequence "3415211312", as shown in the box indicated by numeral 36. The grouping module then sums pairs of adjacent digits "34", "15", "21", "13", and "12" to obtain another clue in the form of sequence "76343". Any suitable rule may be generally used. The grouping module may be arranged to mathematically or logically operate on symbols of the rule affecting information. For example, the grouping module then sums pairs of adjacent digits "76343" to obtain "13", "9", "7", and "7" which are operated on modulo 9 to obtain still another clue in the form of sequence "4977" in accordance with still another rule. This calculation is generally indicated by numeral 38. Each of the digits "4977" represent the number of digits in groups, resulting in six groups indicated by numerals 24, 26, 28, 25, 27 and, 29.

The retrieving system 10 has a separation module 34 that is arranged to separate the plurality of groups from a sequence of digits. The plurality of groups separable from the sequence of digits may consists of groups of information to be concealed and other groups of digits.

In this example the other groups of digits include rule information digits, marker digits, repeat marker digits and lots 1, 2 and 3 of other data. In this example lots 1, 2 and 3 of other data are used in the form of obfuscation bits. In an embodiment, other data may variously carry other useful information such as optional water mark, finger print or error correction information, for example.

Watermarking may allow the decoder to determine that that the concealed information is authentic and not a fake created by, for example, a hacker implementing "a man-in-the-middle-attack". For example, the decoder 16 may conclude that all "Other Data Lots 1, 2 and 3 end with a bit value', and therefore the concealed information is authentic." For example if this is not the case, the decoder may stop its functioning, conclude that the data is not authentic and take no further action, or generate an error message or make a "please resend" request to the concealing system.

Fingerprinting may allow the decoder to determine that the concealed information originated from a trusted originator and is not a fake created by, for example, a hacker implementing "a man-in-the-middle-attack". For example, the decoder 16 may conclude that all "Data Lots 1 and 2 start with a bit whose value is '1' and therefore the concealed information originated from a trusted originator." In this case, otherwise, the decoder may stop its functioning, conclude that the data is not authentic and take no further action, or generate an error message or make a "please resend" request to the concealing system.

The grouping module then reorders the groups in accordance with another rule, in this case the groups "4977..4977 . . . " are reordered to "9477.-9477 . . . ". The digits may then be read as retrieved information 40. The decoder 16 may send the retrieved information to a retrieved information sender 42 that may subsequently turn the retrieved information 40 into a digital file 44 for transmission or storage on tangible media, or into data packets 44 for transmission over a network, or generally process the information for further use as appropriate.

In some alternative embodiments, the rule information determiner 18 is arranged to obtain location information indicative of the location of the rule information from a source external of the concealed information. For example, a URL may be used to look up information on generally any web site. The looked up information may be used as rule information or as information leading to rule information. The rule information determiner may not know exactly where to look on the web site. It may use fuzzy logic, for example "four consecutive digits on this web page", and the decoder may subsequently attempt to decode using every four consecutive digits until the information is successfully retrieved. The value of these digits may be different on different days, for example. The decoder may attempt to decode on several days. In an embodiment, the rule information determiner may not know which website to look at (for example out of which four possible websites), which location (for example out of which three geographic locations), or for example at which device (for example a USB or a mobile phone), which network (for example at a location on an intranet or the internet), using what method (for example through secured log in or without it) or what procedure (for example by using trial and error or through working out additional clues that may be available). Alternately, the decoder may use any website from a group of websites (the group being determined by, for example, mathematical logic or informal reasoning or from other rules or clues) and try "four consecutive digits on each page one after the other" until the information is successfully decoded.

In another alternative embodiment, the rule information determiner is arranged to obtain the rule information using time information, for example today's date. In other embodiments, the rule information determiner may be arranged to obtain the rule information using information derivable from the environment in which the decoder operates, for example the model of the processor, the hard drive capacity, the operating system number etc. In some other embodiments a complex array of logical or mathematical rules or nested rules may be used involving one or more of any of the above described elements or such others in any logical or mathematical interwoven manner.

Figure 3:
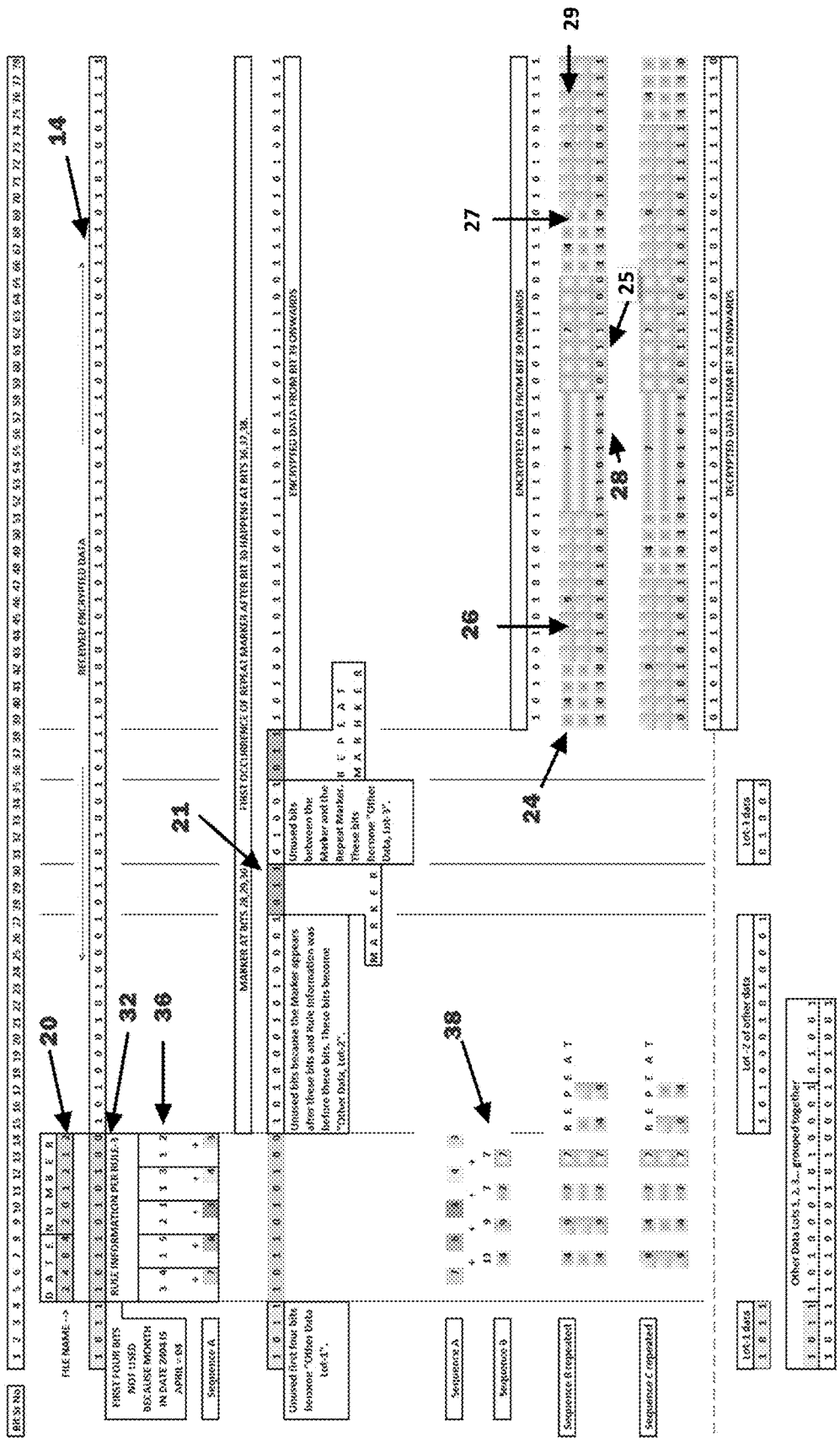
FIG. 3 shows a diagram illustrating the effect of the retrieving system 10 on the concealed information one step at a time.
Figure 4:
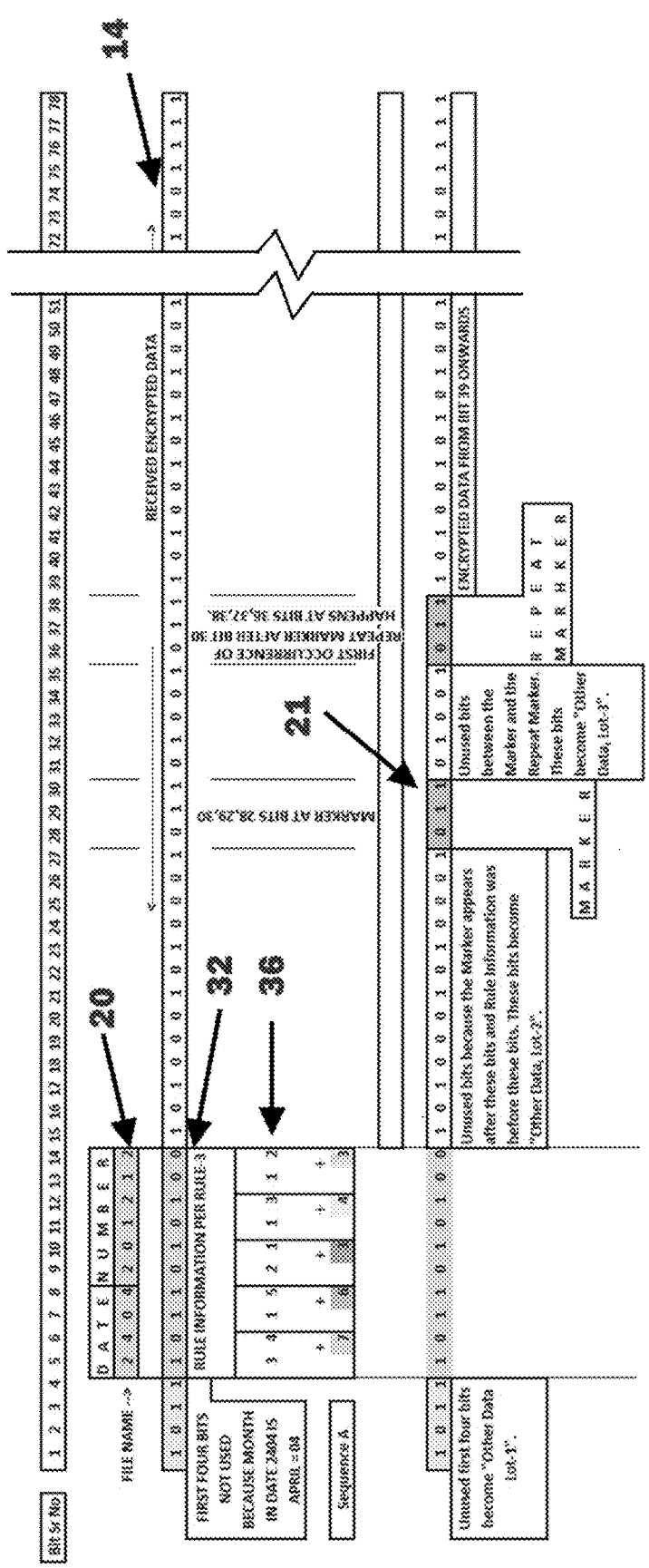
FIGS. 4 to 7 highlight different aspects of FIG. 2 illustrating the operation of the retrieving system on the concealed information at different stages of the process.

FIG. 3 shows a schematic diagram of an embodiment of a concealing system, the system being generally indicated by the numeral 50. As described in further detail below, in this but not in all embodiments, the concealing system 50 comprises a processor 51 having a microprocessor system and memory in communication with the microprocessor. The concealing system 50 may conceal information comprising a sequence of symbols that may be subsequently retrieved using the retrieving system 10. In this example, the symbols are binary digits but generally any types of symbols may be used.

The concealing system 50 has an information receiver 54 in the form of an electronic information receiver (which may be for example, a USB interface, an optical disk drive, a network interface in the form of, for example, a network interface card, or generally any suitable receiver) that receives the information 52 and sends it to an encoder 56. The encoder 56 is configurable using rule information and when so configured operable to form concealed information 60 by applying to the information at least one encoder rule determined by the configuration of the encoder 56. The encoder may have a rule information determiner 64 that is arranged to read the rules from a rule registry incorporated therein, and subsequently configure itself in accordance with the read rule information. Alternatively, another part of the processor may configure the encoder. The rule registry is in the form of volatile and/or nonvolatile memory that may be part of the encoder, or system 50, for example. The concealed information may be sent by a concealed information sender 62 to a tangible computer readable storage media, over a computer network, or to any other suitable module or system. The information sender 62 may comprise a file module for disposing the transmittable concealed information in a file for subsequent transmission to the decoder.

The encoder 56 comprises a digit grouping module 58 arranged to group digits from the sequence of symbols into a plurality of groups of digits and changing the sequence of the plurality of groups of digits. The digit grouping module 58 is arranged to use the rule information 32 to determine a number of digits in each of the plurality of groups.

The concealing system may have a joining module 68 arranged to join the rule information and the concealed information to form transmittable concealed information 70 for subsequent transmission 60 via an information conduit to the decoder 10 which may be remote from the encoder system 50. The joining module may be arranged to put a sequence of other digits in the form of other data, for example, as the other data Lot 1, Lot 2 and Lot 3, together with the rule information. The information may thus be further concealed using the further information. A file module 67 may be arranged to indicate the location of the rule information in file system information of the file.

The joining module may be arranged to dispose the rule information within the other digits for use by the decoder 10. Such other digits may be originally intended to be obfuscation/stuffing bits but instead used for carrying useful data such as the rule information. The rule information may be concealed by generally any suitable method including any one or more of mathematical and/or logical method or rules and/or within the other digits (which may be used as obfuscation/stuffing bits) as generally it will not be known how the rule information and the other digits are relatively disposed. In some embodiments all or part of the rule information may not form a part of encrypted data including other digits and may instead be separately sent, for example as another data file or its part and/or part or all of it may be posted on a website at a particular URL and/or geographic location and/or network and/or device and/or source by one or more means and/or methods and/or procedures. In some embodiments the rule information may only be partially made available or further encrypted and/or concealed and then made available as another data file or its part and/or part or all of it may be posted on a website at a particular URL and/or geographic location and/or network and/or device and/or source by one or more means and/or methods and/or procedures.

The concealing system 50 may comprise a location information module 66 arranged to obtain the location information indicative of the position of the rule information within the transmittable concealed information. The location information may be provided by the location information module to the encoder. The location information may be obtained from within any other information. For example, the location information module may be arranged to obtain information from a web site indicated by a Uniform Resource Locator (URL). The location information module may be arranged to obtain the location information using any logical methods including any one or more of fuzzy logic, propositional or predicate logic, informal reasoning, mathematical logic, computational logic, syllogistic logic, hyposyllogistc logic (having syllogistic value or purpose without the form) and such others. The location information module may be arranged to derive the location information from time information. The location information module may be arranged to derive the location from the environment in which the decoder operates, such as the decoder's processor module. Generally any suitable location information may be used.

Figure 5:
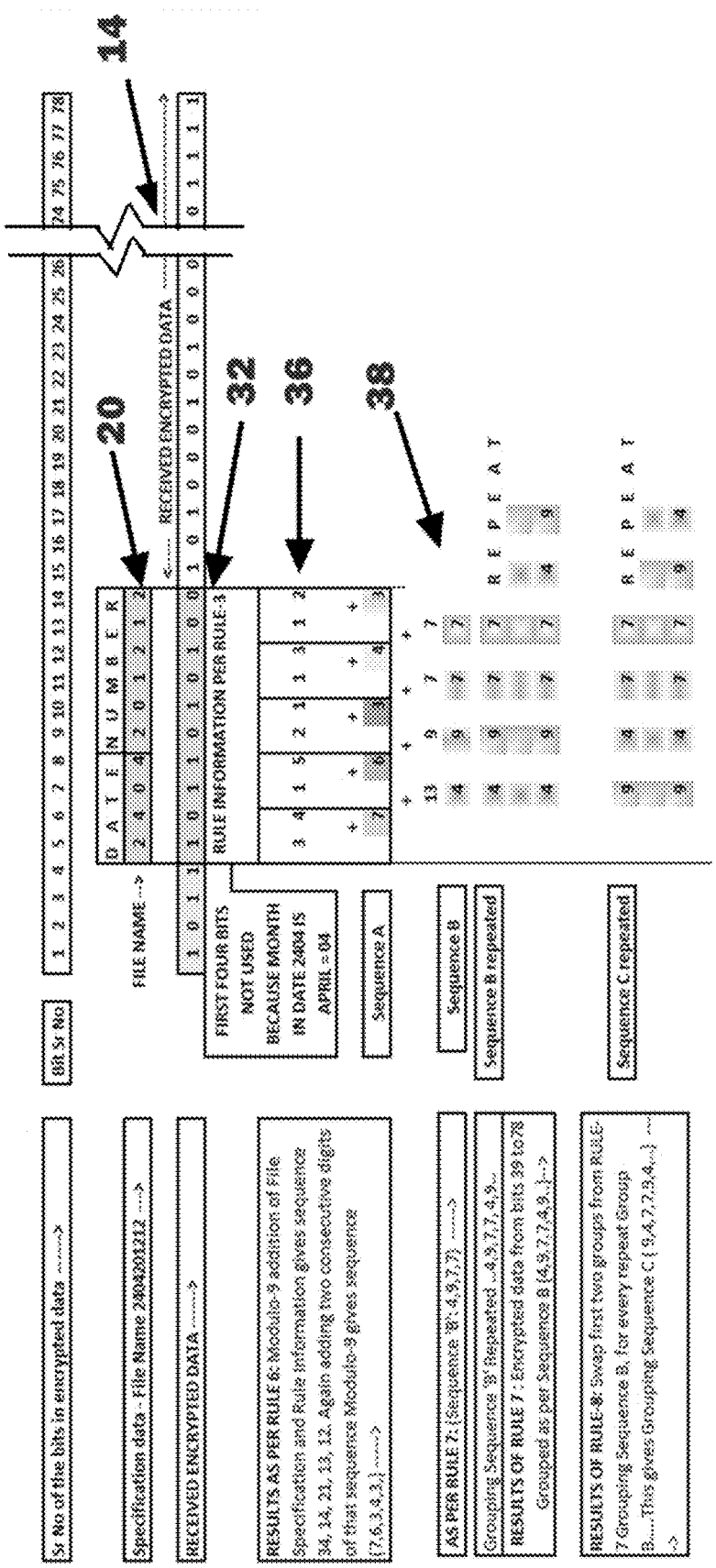
Figure 6:
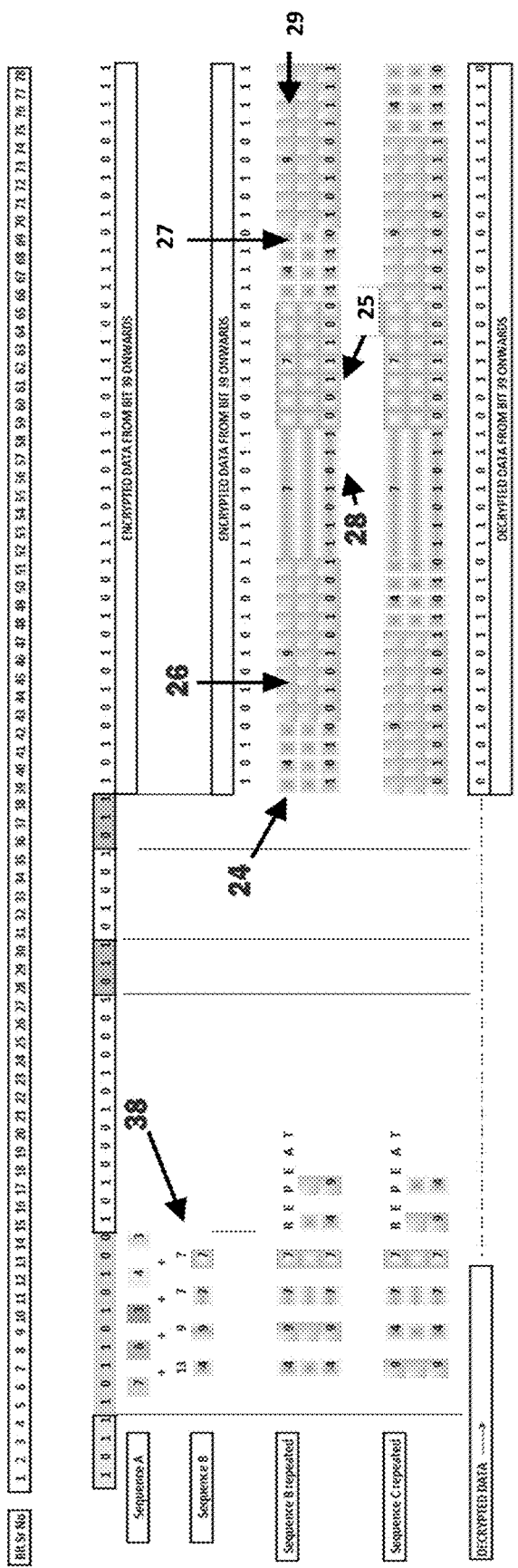
Figure 7:
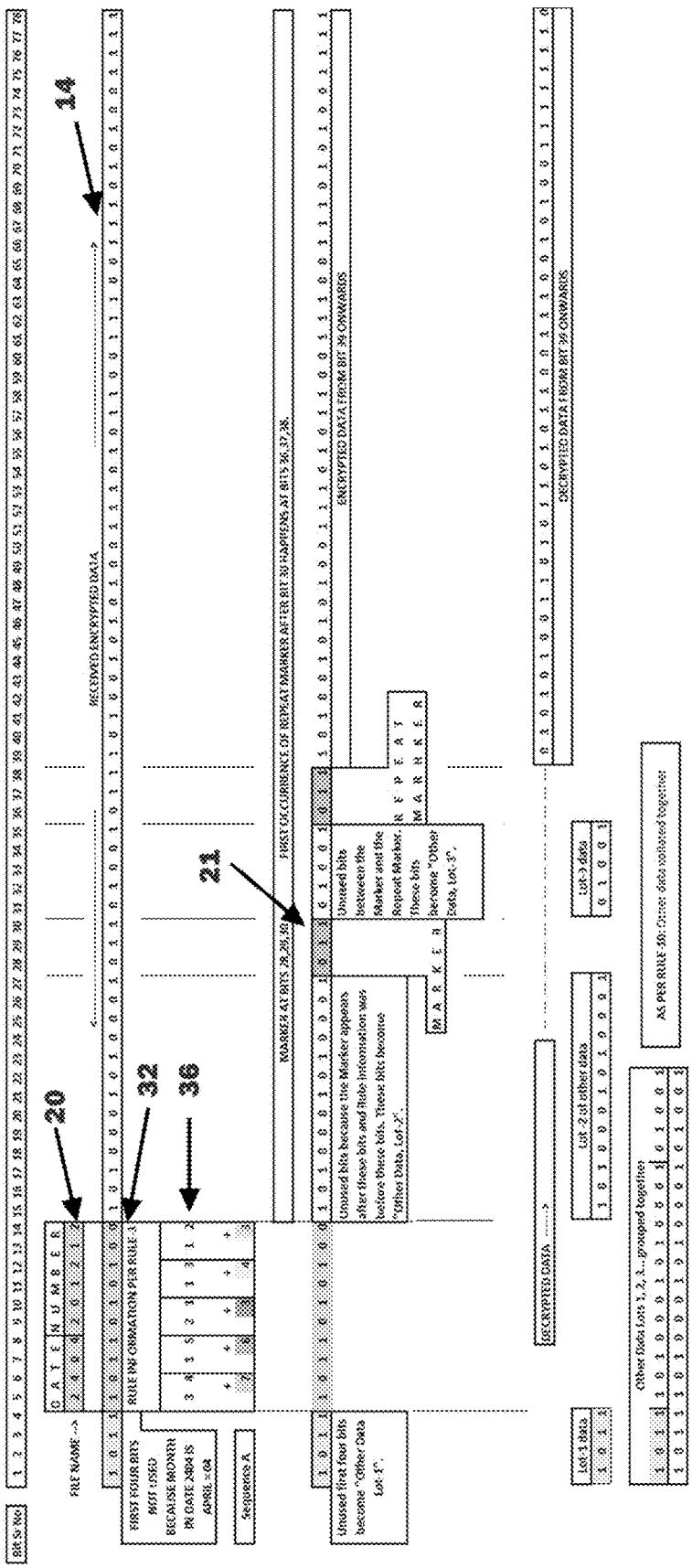

FIG. 5 shows a diagram illustrating an example of an effect of the concealing system 50 of FIG. 2 on the information 52 one step at a time. In this embodiment but not necessarily in all, the encoder 56 is arranged to self-configure using the rule information.

In some embodiments rules may be preloaded or dynamically loaded as desired in the rule registry 64 and the encoder 56 may use them as directed or programmed to conceal information 52 suitably. In this but not necessarily in all embodiments, the rule registry 64 is arranged to generate rule information that is a string of an arbitrary bit sequence '1011010100'. In general any suitable string of symbols may be created and/or used as the rule information and it may have any arbitrary number of symbols suitable for concealing the information 52. Generally but not necessarily, a binary string may be used as the rule information.

In this embodiment but not necessarily in all embodiments, rule affecting information 20 may also be used. In this embodiment but not necessarily in all embodiments, the rule registry arbitrarily creates rule affecting information 20 which in this example is a digital string of symbols "2404201212" where 2404 is the date 24 April and 201212 is the number of the file in which the final result is to be stored, for example. That makes "2402201212" the file name in this example.

In some embodiments rule affecting information is effectively used as tied keys or multiple keys where for example, the string "2402201212" comes from two parts such as "2402" and 201212". The two parts may be treated as tied keys and both are required for the concealment and retrieval of the information.

Rule affecting information may provide renewal or freshness to the concealing process and changing rule information from "2402201212" to anything else will change the concealed information sequence of symbols.

In general any suitable string of symbols may be arbitrarily generated or used as the rule affecting information and it may have any arbitrary number and type of symbols suitable for use in concealing the information 52. Generally but not necessarily, a digital string of symbols may be used as the rule affecting information.

Following a rule in this but not necessarily i all embodiments, the digit grouping module adds the string of symbols of the rule information 32 which in this case is '1011010100' with the string of symbols of the rule affecting information which in this case is "2404201212" to create a clue in the form of sequence "3415211312", as shown in the box indicated by numeral 36.

Following another rule the grouping module then sums pairs of adjacent digits "34", "1", "21", "13", and "12" to obtain another clue in the form of sequence "76343". Any suitable rule or rules may be generally used.

The grouping module then sums pairs of adjacent digits "76343" to obtain "13", "9", "7", and "7" which are operated on modulo 9 to obtain still another clue in the form of sequence "4977" in accordance with still another rule. This calculation is generally indicated by numeral 38. Each of the digits "4977" represent the number of digits in groups which are then repeated over all of the information to be concealed, giving a structure of "4977..4977 . . . "

Following another rule the grouping module then regroups the sequence of groups "4977..4977 . . . " as groups "9477..9477 . . . ". From this point, in this example, the grouping module commences action to conceal information 52 as follows.

First the grouping module divides the information 52 in group sequence "9477..9477 . . . " with 9 symbols in the first group, 4 symbols in the next group and so on, till all information is exhausted. In this case it creates six groups of data in the groups of symbols marked by numerals 26, 24, 28, 25, 29 and 27 in that order.

Then the grouping module rearranges the groups of "9477 .9477 . . . " as "4977 .4977 . . . " as per the previous rule for regrouping. This results in six groups of symbols indicated by numerals 24, 26, 28, 25, 27 and 29 in that order. To further conceal it, a location information module 66 uses an example of a double marker rule "that this encoded information will be placed in the concealed sequence immediately after second random repeat of a marker" shown by numeral 21. Use of markers in this but not necessarily all embodiments is for the purpose of obfuscation. Markers may also be used in some embodiments as keys that can be exchanged using any key exchange mechanism. Any obfuscation rule such as the marker rule for example, may be used in some but not necessarily in all embodiments. The rule registry generates marker '01 Γ as well as other data' lots of arbitrary bits marked Lots 2 and 3 data which are grouped together. Then the joining module 68 joins the results of the above operations in the following sequence. It first takes the regrouped string consisting of the six groups of symbols indicated by numerals 24, 26, 28, 25, 27 and 29. It then adds "repeat marker" string '011' in front of it, then adds Lot 3 data in front of it, then adds string 'O1, shown by numeral 21, as the "first marker" then adds Lot-2 data in front of it. In this example, the joining module then adds the rule information string "1011010100" in front of it. Any rule may be used to join the rule information and the concealed information to form transmittable concealed information. In this and not necessarily in all embodiments the rule information is joined with concealed information to form transmittable concealed information.

Finally, using another rule in this example, the location module decides that "the month of April represented by the bits '04' in the rule affecting information '2404201212' is to be used as the number of obfuscation bits to be added in front of the rule information within the concealed transmittable information", four obfuscation bits are added in front of the sequence. The four bits are '1011' marked Lot-1 in the final result of the encoder or transmittable concealed information marked with numeral 60 in FIG. 5.

In general any number of rules may be used to reorder the repackage the regrouped sequence and any sequencing rules may be used.

The concealed information sequence may be generally made available to the decoder as required by the application. The concealed information may therefore be placed in one or more files by the file module 67. The file module is generally able to create a file or files of any suitable type. The file module then outputs the files to the concealed information sender 62. Concealed information sender 62 is arranged to take files and process them suitably to suit their transmission over a range of transmission media (for example, an intranet or internet) using a range of technology and channeling options. In some embodiments the concealed information 60 is able to be fragmented in data pieces.

In this but not necessarily in all embodiments, as determined by the location information module 66 for determining location of the rule affecting information, the concealed information 60 is placed in a single file and its corresponding rule affecting information 20 is used by the filing module as the file specification for that file.

Figure 8:
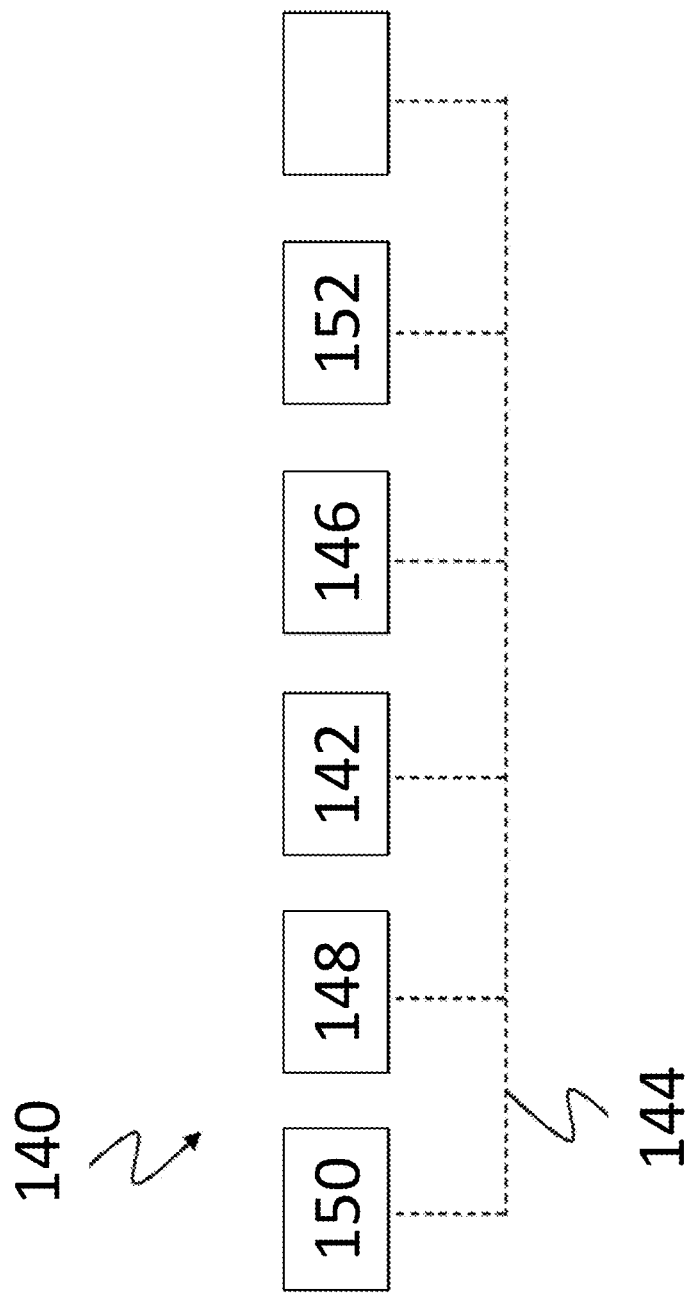
FIG. 8 shows a schematic diagram of a processor of either one of the retrieving system of FIG. 1 and the concealing system of FIG. 2.

FIG. 8 shows a schematic diagram of an example architecture of a processor 140 (which may be, for example, either one of processor 11 of FIG. 1 and processor 51 of FIG. 2). The processor can execute the steps of the methods disclosed herein, for example. The methods may be coded in a program for instructing the processor. The program is, in this embodiment stored in nonvolatile memory 148 in the form of a hard disk drive, but could be stored in FLASH, EPROM or any other form of tangible media within or external of the processor. The program generally, but not necessarily, comprises a plurality of software modules that cooperate when installed on the processor so that the steps of a method are performed. The software modules, at least in part, correspond to the steps of the method or components of the system described above. The functions or components may be compartmentalised into modules or may be fragmented across several software modules. For example, in one embodiment the software has an encoder module and/or a decoder module as appropriate, and a file system module. The software modules may be formed using any suitable language, examples of which include C++ and assembly. The program may take the form of an application program interface or any other suitable software structure. The processor 140 includes a suitable micro processor system 142, examples of which include but are not limited to the INTEL XEON, AMD OPTERON, or a plurality of interconnected microprocessors. The microprocessor system is connected over a bus 144 to a random access memory 146 of around 1 GB, although other values are possible and a nonvolatile memory such as a hard disk drive 148 or solid state non-volatile memory having a capacity of around 100 Gb, although other values are possible. Alternative logic devices may be used in place of the microprocessor 142. Examples of suitable alternative logic devices include application-specific integrated circuits, FPGAs, and digital signal processing units. Some of these embodiments may be entirely hardware based for further latency reduction or other reasons. The processor 140 has input/output interfaces 150 which may include one or more network interfaces, and a universal serial bus. The processor may support a human machine interface 152 e.g. mouse, keyboard, display etc. Alternative and/or additional features of embodiments.

The embodiments described above may, but not necessarily, additionally have further features detailed below.

In an embodiment, information to be concealed may be in part concealed by this method and in part by this or another method and the results suitably combined.

In an embodiment, any permutation and or combination of the features and or steps of this method may be suitably combined.

In an embodiment one or more features of different embodiments may be suitably combined.

In an embodiment the other symbols, digits or bits may be used generally in the form of obfuscation/stuffing bits may sometimes carry other useful data that may be related to the information being concealed, for example, such as water mark data, finger print data, message numbering data or obfuscation data.

In an embodiment, a sequence of symbols may be compressed information.

In an embodiment, a sequence of symbols may be encrypted information.

In an embodiment, the sequence of symbols may be concealed information.

In an embodiment rule affecting information, which may be a type of key, may be required by the decoder to retrieve concealed information. The rule affecting information may be exchanged between the encoder and the decoder using generally any suitable exchange method, for example a known key exchange method, an example of which is includes but is not limited to transport of non transient physical media (for example a USB FLASH drive) storing the rule affecting information. One party may speak the rule affecting information to another.

In an embodiment use of more than one rule affecting information (and/or other data, markers, etc.), which may be a type of multiple keys, may be at least one of tied with each other and tied hierarchically (to create group keys). The more than one rule affecting information that are at least one of tied with each other and tied hierarchically may be used by a group of retrieving system and concealing system users. The users may use the tied more than one rule affecting information to retrieve together as a whole the information that was concealed.

In an embodiment, the rule information may be generated by the decoder and exchanged with the encoder through any suitable rule information exchange protocol (The any suitable rule information exchange protocol may but not necessarily be any suitable key exchange protocol). The rule information so exchanged in this way may be used as a key of the user of the decoder. The key may be private. This key may then be used by the encoder to encode the message to provide a secured session key for concealing information within one session.

In some embodiments the rule affecting information may be a key in the form of a string of data, for example a string of symbols. The rule affecting information may be received by the decoding system 10 or the decoder 16 through channels other than those described herein, for example in the form of a key, or a clue.

In an embodiment at least one of the concealed information and the transmittable concealed information and the file containing pieces of one or the other, may be organized to reach the decoder through a plurality of routes and/or a plurality of transmission processes and/or a plurality of channels and may then be suitably combined before the operation of the decoder. Before combination, the at least one of the concealed information and the transmittable concealed information and the file containing pieces of one or the other may be reprocessed.

In some embodiments the symbol grouping module is arranged to select or discard symbols to be grouped and subsequently at least one of group them, change the order of groups, change the order of symbols within groups, rearrange symbols and/or groups, select symbols and/or groups, complete groups by addition of notional symbols where symbols are not sufficient to complete a group if and as required, and do all such other necessary and/or incidental functions. The symbol grouping module may be arranged to execute any requirement of the rule information or rule registry in terms of any of the symbol grouping, regrouping, reordering, selecting, reforming, reformatting, completing, removing, selecting and such other manipulating requirements to execute any rules.

In an embodiment, the symbol grouping module may be arranged to operate, for example mathematically, on at least one of symbols, groups, and digits. The symbol grouping module may be arranged to manipulate the at least one of symbols, groups, and digits within at least one of rule information, rule affecting information, concealed information other received and intermediate sequences of symbols or digits. In general, the symbol grouping module may be also arranged to at least one of:

operate, for example mathematically, and/or manipulate, for example through rearrangement of, one or more of bits, digits, symbols, groups and strings within one or more of rule information, rule affecting information, information to be concealed; other generated and/or calculated and/or operated and/or processed intermediate symbols, bits, digits; groups, strings, or sequences of any of these;

decide the values and numbers of symbols in a group; select symbols or groups for particular action by the encoder based on any rules; rebuild groups and regroup them;

change the order of symbols within groups; and change the order of groups. Concealed information or rule information may be retrieved by finding through one or more of: Sources; Places; Devices; Networks; Means; Methods; Rules; Procedures; Logical Approaches and/or Methods (including Fuzzy Logic, Many-Valued-Logic, Probabilistic Logic, Predicate Logic, Prepositional Logic or such other disciplines of Logic and Intuitive Logic, Informal Reasoning, Mathematical Logic, Computations Logic, Syllogistic Logic, Hypo syllogistic Logic having syllogistic value or purpose without the form, or any other discipline of logic); Mathematical approaches; Other approaches (for example psychological or human behavioral or artificial intelligence approaches); Arrangements such as single party arrangement, multi-party arrangement, for example, single key concealing one at a time or simultaneous multiple key concealing; Medium used such as paper based medium, electronic medium, physical medium or other medium whatsoever; and pieces of, or whole of, necessary logical rules and/or mathematical rules and/or other rules and/or information and/or clues and/or hints to find or generate or make a key or keys to retrieve the concealed information.

In some embodiment of the proposed invention the key is either not sent at all or sent right along with the concealed information itself but in a generally unrecognized form or format.

The process of revealing may then work through a range of solutions, depending on the design criteria, on either finding the key from the data and/or information that is searchable and/or already available and/or working through a range of data and/or information and/or rule/s and/or approach/es and/or clue/s and/or hints to work out the ways of making and/or generating the key and applying it. Some of these processes may be straightforward and others may involve repeatedly and/or reiteratively working through one or more of different logical and mathematical approaches, or other approaches such as human behavioral approaches, for example. The method may be, however, generally different from 'brute force' approaches in that not all possible permutations and combinations are tried for every possible eventuality but rather to work through clues and hints and performing selective and/or preferential trials of what the method determines to be the candidate solutions and/or approaches based on the solution approach selected and/or data and/or information available and/or searchable.

Embodiments may include the sub-set or option of finding the key/s itself/themselves in which case it/they may be directly used without having to generate it/them.

Embodiments may include the sub-set or option of not requiring the key but a hint or a clue on the process of retrieving in which case it may be directly used without the need for a key.

Embodiments may provide a large toolset to choose from for concealment and retrieving.

Depending on the application, security may arise, for example, from a large set of all possible options, periodic changes to the tool set being used, nesting of different rules for different implementations and the quality of clues and hints generated by the implementer along with the control of level of information made available for retrieving—thereby requiring in some cases semi-intelligent and in some cases very intelligent approaches to retrieving. Further complicating factors may be added by requiring human or machine (for example artificially intelligent machine) interaction at one or more points for example requiring a password or passphrase or personal unblocking code (pin), for example.

In some embodiment the rule/s and/or clue/s and or hint s for generating/making key/s or concealing/revealing key/s may be sent by multiple mediums one at a time.

In some embodiments it is possible that not only no key may be sent (separately or otherwise) and no hint or clue may be sent directly and it may be left to cognitive learning means of the decoder or decoding method or system to successfully generate the key to retrieve data.

For the systems that rely on the use of a conventional key (for example key based mathematical algorithm encryption systems, whether employing a single key or multiple keys simultaneously or in tandem or sequence), sending the key to retrieve encrypted information may require extensive security and key management. There is a long felt need for a system that can generate or find or make its own key without the need for sending the key at all in some embodiments or without the need for sending the key separately in other embodiments. Mathematical encryption may be broken by brute force approaches that become feasible with increased computing power and quantum computing. Embodiments may provide an effective alternate for many and concealing and retrieving needs of the modern times.

The rule determiner 18 may be arranged to determine rule information and from rule information the rule or rules that the decoder 16 and/or system 10 and/or grouping module and/or operations module may follow/apply to retrieve concealed information 14. The rule determiner 18 may follow any logical and/or mathematical and/or any other rule (for example scientific rules) and/or be assisted (for example interpretation from a software program available to the decoder) and/or procedure (for example intuitive self-learning procedures) and may employ its own means (for example, artificial intelligence) and/or assisted means (for example, assisted by software or data sourced from anywhere or generally suitably assisted) to determine rule information and/or may look for whole or part of any rule information through any one or more of data, sources, places, devices, networks, means, media or its environment (for example including rule registry and/or grouping module and/or operations module and/or hardware and/or software that it may be operating with or in conjunction and/or some proximity with including operating system and/or network and/or any cloud based environment).

Several examples are described below of how the rule information determiner may determine some rules. The list of examples below is exemplary and not exhaustive.

In the simplest of embodiments the rule information determiner may simply assist decoder 16 to read the rule/s from the rule registry 17 and using the rule/s to configure itself (decoder 16) to decrypt retrieve encrypted information 14 using appropriate functions of grouping module 22 and operations module 34 to operate, group and structure data appropriately in the order dictated by the rule/s from the rule registry 17.

In some other embodiment the rule information determiner may find a key from data already available to it (for example a key buried within the encrypted data and the location and/or structure of the key being read from rule registry 17), and thereby helping decoder 10 to retrieve concealed information 14.

In some other embodiments the rule information determiner 18 may have prior rule information about some rule/s and clue/s about other rule/s. Such prior information or clue may be contained in any data (for example encrypted data), any rule (for example in a rule in the rule registry), location (for example at a pre-defined location at a given URL), any source (for example in a USB), any form (for example in a voice recording that is able to be read in correct form needed by the decoder) from where the rule determiner may generate/build/retrieve other necessary rule/s information by applying that rule/s information for the purpose of retrieving concealed data. If the rule information is in the form of a clue, the rule information determiner may decode the clue (or find/generate/develop a fitting answer to the clue) to arrive at the required rule/s information for retrieving. Generation of the fitting answer, for example, may make use of fuzzy logic and/or any other discipline of logical (for example intuitive logic) or methodical approach/es (for example scientific or psychological approach to the problem of rule determination). The clue and how the clue is dealt with by the rule determiner and its various approaches may provide logical bounds to the ways of searching for rule information or arriving at rule information, in an embodiment.

In some other embodiments the rule information determiner 18 may have prior information about some rule/s and no information and no clue/s about other rule/s. In that case it may progressively develop the rule for which it has prior information and attempt one after the other any possible/candidate clues to arrive at other rule/s and may step by step validate or invalidate each rule developed from a possible/candidate clue until the system as a whole determines through an iterative process that the correct set of rule/s have been generated/built/retrieved by the rules information determiner and the full rule information is able to be used to successfully reveal/retrieve/decrypt encrypted data 14. If the rule/s is/are largely known and missing rules and/or clues are relatively small or easy, the probability of successful retrieving/decryption may be made fairly high using artificial intelligence, for example.

In yet other embodiments the rule information determiner 18 may have no prior information about any rule/s and no information or clue/s either and then it may go on to progressively develop and attempt one after the other any possible rules and clues and may step by step validate or invalidate each rule developed from every possible clue until the system as a whole determines through an iterative process that may necessary and sufficient correct set of rule/s have been generated/built/retrieved by the rules information determiner and the full rule information is able to be used to successfully reveal/retrieve/decrypt encrypted data 14. There is no certainty that the decoder may definitely succeed in its objective however the probability of success may increase with each iterative step and the overall process may be helped by intuitive approaches in a well-designed system. In this approach the rule information determiner may narrow down its iterative options through use of logical approaches for example, such as use of intuitive logic combined with behavioral approaches. Once again, how the rule determiner tries and/or limits approaches may provide logical bounds to the ways of finding the rule information or in arriving at rule information, in an embodiment.

Rule registry 17 may generally hold and/or be capable of holding pre-set and/or periodically programmable rules and/or rules as determined by the rule information determiner 18 from time to time so as to make all necessary rules available, along with their correct sequence determined by the rule information determiner 18, to the decoder 16 as a whole in general, and with appropriate aspects of those rules in correct sequence for grouping module 22 and operations module 34, so as to provide the full set of rules required for decrypting/retrieving correct data set from the encrypted data 14 being received through receiver 12.

What exact process a given rule determiner may go through to determine rules and their sequence of operation may depend on which possible method or system for concealing/encrypting information was applied by embodiments; and how, how much and what information about those rules is available, how and where for decrypting/retrieving by the embodiments.

In some embodiments rule information determiner 18 and rules registry 17 may be merged as a single functional and/or physical unit. In an embodiment one of more of the discrete blocks shown in FIG. 1 may be merged together functionally and/or physically and therefore the description and functional operation/s used for various blocks here is illustrative only.

The rule information determiner 18 may have prior rule information about some rule/s.

In some embodiments the rule information determiner may have artificial intelligence or the ability to learn and/or recall learning, and/or improve on/from it, (for example using disciplines of logic).

The rule information determiner may be capable of applying intuitive and/or fuzzy logic.

FURTHER EXAMPLES

Example-1

In this example it is shown how a decoder may use one method of logic to work out how to decode using logical approach.

In this example a decoder requires some additional information before it may decode. The required information may be any one of rule information or rule affecting information or a marker.

In this example the decoder is able to look into the rule registry and from there it determines that based on a stored rule the missing information has to have three symbols.

The rule registry in this embodiment is able to generate symbols, for example. It knows that the symbols could be any symbols however it decides to try binary symbols first. So it decides to work through all possible combinations of the three binary symbols sequences which are 000, 001, 010, 011, 100, 101, 110 and 111. It tries them one after the other and tries to decode and becomes successful in decoding when the sequence is 011. In this method of logic, it concluded that digital symbols were more likely and it succeeded. This method of intuitive logic to work out, for example, rule information or rule affecting information, or missing parts thereof, in some embodiments may be used to work as "key-less" and/or "key-exchange less" methods of, concealment and retrieval. Other embodiments may variously use other types of logic for example, syllogistic logic, hyposyllogistic logic, multi-valued logic, fuzzy logic, predicate logic, probabilistic logic, propositional logic, informal reasoning and such others. Depending on the overall intelligence of the system and methods, a whole range of usable methods may be implemented in various embodiments. This is one of the biggest advantages of this invention in all its possible applications.

Example-2

Let it be assumed that in the above example the symbols were digits. Now the rule registry will have too many options to work through. So it decides to ask for a clue. The encoder then sends a clue which is in the form of a picture of a square, a picture of a triangle and a question mark in a sequence.

Now the rule registry rightly or wrongly concludes mat a square represents a digit of 4, the triangle a digit of 3 and the question mark means the last digit is unclear. The rule registry then decides to try that. This time it decides to try the third place symbol as a digit and decides to try from middle of the scale. Therefore it tries 5 first. In this case that does not work out so it decides to try in the order of 6, 7, 8, 9 and then 1, 0, 2, 3, 4. It tries that and when the value reaches 8, it is able to decode. This method of using logic to work out, for example, rule information or rule affecting information provides for syllogistic and other logic based approaches for concealment and or retrieval.

In this way, though there was no certainly of the clue giving the correct or even a possible answer, the decoder was able to employ a logical method to work out the correct information required to decode the concealed information.

A number of logical approaches exist and a well-designed system may in this way reduce the number of attempts required to retrieve concealed information in a meaningful way. Clues and hints allow this process to be somewhat simplified for intelligent retrieval system or intelligent decoder. The main difference in this approach and the normal challenge response systems is that the encoder has not previously asked the information to be used that it will use for clue or hint or even for deciding how and what information should be missing. It could, it may not need to for this purpose. Depending on the overall intelligence of the system and methods, a whole range of usable methods may be implemented in various embodiments. This is one of the biggest advantages of this invention in all its possible applications.

Example-3

In the Example-1 above, if the digital symbols were not able to produce desired result, for example, the retrieval system or the decoder may look out for what the overall context was. For example, if the symbols were all Chinese characters, it may have concluded that the three symbols were Chinese as Well. This may have worked out in correct decoding particularly if the clue and hint method of Example 2 were used to limit the scope of all searches. In this way, intelligent systems in various embodiments can use contextual intelligence in applying logic disciplines such as syllogistic logic.

Now that embodiments have been described, it will be appreciated that some embodiments may have some of the following advantages:
  No key may need to be sent separately. Only rules and/or clues about the rule information (for example the location of clue or the rule or both) may be sent. In some embodiments only part rule information may be sent or made available and in others none may be sent or made available depending on logical approaches used.
  The logical nestings of separate logic interwoven with high probabilistic simple mathematical and/or logical events may make the concealing harder to break than some key-based encryption techniques.
  The vast number of possible rules and their varied nature may make the concealing difficult to break. When combined with nesting with different rules and the addition of meaningless data the complexity levels for encryption may be made as high as desired while keeping both encoding and decoding elegant and relatively simple compared to complex mathematical algorithms or public and private key systems.
  Every concealed file may be different.
  Embodiments of the above disclosed systems and methods may meet the security needs of some artificial intelligent systems which may be able to exploit not only mathematical but a variety of logical, arbitrary rule based approaches available for concealment and retrieval. The word logic here includes disciplines of logic, such as for example, fuzzy logic, predictive logic, syllogistic logic, etc.
  Embodiments of the above disclosed systems and methods may be particularly suitable for the era of high powered fast computers which may break into any purely mathematical concealment system with brute force decrypting and information retrieval.

Variations and/or modifications may be made to the embodiments described without departing from the spirit or ambit of the invention. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

APPENDIX

Some non-limiting examples of rules for the decoder now follow.

Rule-1

"File specification consists of 10 bits where the first four bits of the specification are the file creation date expressed as date digits folio wed by month digits and the last six bits are the file number". (The first four bits of the file specification 20 are the file creation date 24 April written as 2404 and the last six bits are the file number 201212. The file specification then becomes the file creation date followed by the file number as 2404201212).

Rule-2

"The rule information is located within the encrypted information and commences at the bit just after the bit with the same serial number as the month in the file creation date". (Because the month is April (04), the rule information determiner knows that the rule information 32 commences at the fifth bit of the encrypted data). (The first four bits become other bits as per Rule 9 below).

Rule-3

"The rule information has the same number of bits as the file specification". (As the file specification 20 is 10 bits long, from Rule 1, 2 and 3 the rule information determiner concludes that the rule information is within the encrypted data 14, and comprises bits 5 to 14, counting from the left, of the encrypted data. Therefore rule information 32 is '1011010100').

Rule-4

"A marker symbol sequence is from bits 28 to 30 of the encrypted sequence". (Bits 28 to 30 return marker sequence "Ui i" indicated by numeral zi).

Rule-5

"Grouping module to apply Rules 7 and 8 only to the encrypted data bits just after the first repeat of the marker symbol sequence that is found beyond the last bit of marker in RULE-4". (Look for marker repeat after bit 30 because the last marker bit as per RULE-4 is bit 30. The first repeat of the marker "OH" occurs at bits 36 to 38. Therefore the grouping module knows that grouping as per RULE-7 is to be done only for bits of encrypted data between bits 39 and the end of encrypted data bit 78.)

Rule-6

"Make a Modulo-9 addition of File Specification 20 (which is 2404201212) and Rule Information 32 (which is 1011010100). Take the result and add its two consecutive bits Modulo 9 again. The result is Grouping Sequence A". (The grouping module 22 adds each digit of the file name to a corresponding digit of the rule information 32 to obtain a clue in the form of sequence "3415211312", as shown in the box indicated by numeral 36. The grouping module then sums pairs of adjacent bits "34", "15", "21", "13", and "12" to obtain sequence "7, 6, 3, 4, 3" as sequence A for this embodiment.)

Rule-7

"Make a Modulo-9 addition of every two consecutive bits from the result of Grouping Sequence A. This gives Grouping Sequence B. Organize encrypted data bits as per Rule-5 into groups such that the number of bits in each sequential group is the same as number in Sequence B". (The grouping module sums pairs of adjacent bits "7, 6, 3, 4, 3" Modulo-9 to obtain the sequence "4, 9, 7, 7" as shown here by numeral 38. Each of the bits "4, 9, 7, 7" represent the number of bits of encrypted data that are to be grouped together. The result of Rule 5 shows that encrypted data grouping must begin only at bit 39 onwards and go on until the last bit 78. The resulting grouping gives six groups only (as shown by numerals 24, 26, and 28, 25, 27 and 29 for this embodiment because after that all encrypted data is exhausted).

Rule-8

"Swap the first and the second groups of data for all repeats of Grouping Sequence B applied as per RULE-7. The new data sequence that results gives the retrieved information 40". (The grouping module reorders in this case the groups of bits from '4, 9, 7, 7' to '9, 4, 7, 7'. To do that, the grouping module reorders all content of group represented by '9' to be at the front of all contents of group represented by '4' for all repeats of the Sequence B. The result is the new sequence shown in 40 and that is the retrieved information.).

Rule-9

"Any bits of encrypted data that have not been used as file information or rule information or marker or repeat marker or regrouped bits corresponding to retrieved data are called "other data". They are there in the first place to provide syntax to the encrypted data".

Rule-10

"All bits of "other data" may be collated and regrouped to be utilized for any purpose, such as watermark, further rules, further syntextual information, redundancy, error detection, error correction, error control, error display, any nesting information or any other information whatsoever". (Other data are therefore sequentially grouped together and may then be further processed to provide any of the functions listed under RULE-10 above or any other function through more Rule/s) Some non-limiting examples of rules for the encoder now follow.

Rule-1

"Create a six bit file number consisting of any digits from 1 to 9. Create four bit date data for the file creation date as date digits followed by month digits. File specification may then be the date data followed by the file number. Use this specification (for example as file number and date) to save the file of encrypted data produced as per RULE-11". (Create file number, for example, as 201212. Create date data, for example as 2404. The file specification then is the file creation date followed by the file number: 2404201212. Encrypted data coming from RULE-12 is saved with this file specification and therefore its file number will be 201212 and its file creation date will be 2404.).

Rule-2

"At will, create rule information bits for decoder using only T and '0' digits. The number of bits in the rule information must be the same number of bits as in the file specification." (Create rule information 32 often digits, for example as, '1011010100').

Rule-3

"The rule information is to be placed within the encrypted information and its placement commences at the bit just after the bit with the same serial number as the month in the file creation date". (Because the month is April (04), placement of the rule information 32 commences at the bit with serial number 5, that is, the fifth bit of encrypted data. Under Rule-2, rule information has ten digits. Therefore the rule information 32 is to be placed within bits with serial numbers 5 to 14.)

Rule-4

"Create obfuscation bits using only digits 'T and '0' to fill up any spaces before RULE-3 data placement". (Artificially create four obfuscation bits, for example, '1, 0, 1, 1' to fill up four places before RULE-3 location or before the fifth bit of the encrypted data.).

Rule-5

"Artificially create and place a marker symbol sequence at digits 28 to 30 of the encrypted sequence. Repeat this marker sequence after some number of bits again." (Create a marker sequence, for example as 'O, 1, 1' for bits serial numbers 28 to 30. Repeat this marker sequence, for example, for bits serial number 36-38 which also will now have bits '0, 1, 1').

Rule-6

"Create obfuscation bits using only 'l' and '0' to fill up any spaces between RULE-3 and RULE-5 data. Similarly create obfuscation bits using only digits T and '0' to fill up any spaces between Marker and Repeat of Marker in RULE-5". (Artificially create, for example, bits '1, 0, 1, 0, 0, 0, 1, 0, 1, 0, 0, 0, l' to fill up all empty places between RULE-3 and RULE-5 data placements. Therefore in this case obfuscation data will fit in bits with serial numbers 15 to 27, both inclusive. Similarly create, for example, bits 'O, 1, 0, 0, 1' to fill up five spaces serial number 31-35 both inclusive between Marker and the Repeat Marker.)

Rule-7 "Make a Modulo-9 addition of File Specification 20 (which is 2404201212) and Rule Information 32 (which is 1011010100). Take the result and add its two consecutive bits Modulo 9. The result is then Grouping Sequence A". (The grouping module 22 adds each digit of the file specification to a corresponding digit of the rule information 32 to obtain a clue in the form of sequence "3415211312", as shown in the box indicated by numeral 36. The grouping module then sums pairs of adjacent digits "34", "15", "21", "13", and "12" to obtain sequence "7, 6, 3, 4, 3" as sequence A.)

Rule-8

"Make a Modulo-9 addition of every two consecutive bits from the result of Grouping Sequence A. This gives Grouping Sequence B". (The grouping module sums pairs of adjacent digits "7, 6, 3, 4, 3" Modulo-9 to obtain the sequence "4, 9, 7, 7" as shown here by numeral 38.).

Rule-9

"Swap the first and the second groups of Grouping Sequence B from the result and that now gives the Grouping Sequence C. Grouping module is now to group all incoming data to be as per Grouping Sequence C and repeat Sequence C until all incoming data is exhausted". (Swapping the first and second group of Grouping Sequence B which is 4, 9, 7, 7, now gives Grouping Sequence C which becomes 9, 4, 7, 7. Repeating it till all data is exhausted makes six groups of all incoming data as follows . . . Groups of 9, 4, 7, 7, 9, 4 bit groups.)

Rule-10

"From the data organized by RULE-9 shift all the bits representing the second group to come in front of all the bits representing the corresponding first group while keeping all the rest of the sequence as is. Do this for all of the second groups bits and all of the first groups bits for each repeat of Sequence C in Rule-9." (The grouping module reorders all bits representing Group '4' to come at the front of all bits representing Group '9' in Grouping Sequence C. This is done for each repeat of Sequence. The resulting grouping gives three groups only as shown by numerals 24, 26, and 28 for this embodiment because after that the incoming data is exhausted.)

Rule-11

"The encrypted data sequence is now to be created as follows by the Data Joiner Module. First place all bits from RULE-4. Then place all bits from RULE-3. Then place all the bits from RULE-6 and RULE-5 bits in correct sequence. Then place all bits from RULE-10. The resulting bit stream is the encrypted data". (The encrypted data sequence is created by Data Joiner Module as follows. First four bits are obfuscation bits from RULE-4. Bits 5-14 containing rule information from RULE-3. Then obfuscation bits 15-27 from RULE-6, bits 28-30 containing marker from RULE-5, obfuscation bits 31-35 from RULE-6 and bits 36-38 containing repeat marker from RULE-5. Then data organized as per RULE-10 for all remaining bits 39 to 78. The full sequence now represents encrypted data.)

Rule-12

"The encrypted data may be exported as a file whose file specification is as per Rule 1". (The encrypted data file is now saved as per file name, date and specification as per Rule 1).

The invention claimed is:

1. A method for concealing information comprising a sequence of symbols, the method comprising the steps of:
a concealing system, the concealing system comprising a network interface in communication with the internet and an encoder, obtaining location information from a web site indicated by a Uniform Resource Locator (URL);
the concealing system obtaining via the internet rule information from a location indicated by the location information, the rule information being indicative of a rule for discarding a plurality of symbols;
the concealing system using the rule information obtained to configure the encoder; and
the encoder configured to form concealed information by applying to the information comprising the sequence of symbols at least one encoder rule determined by the configuration of the encoder;
wherein the encoder comprises a symbol grouping module arranged to group symbols from the sequence of symbols into a plurality of groups of symbols and changing the sequence of the plurality of groups of symbols; and
wherein the symbol grouping module is arranged to use the rule information to determine a number of symbols in each of the plurality of groups of symbols.

2. A method for retrieving information concealed within a sequence of symbols, the method comprising the steps of:
a retrieving system, the retrieving system comprising a network interface in communication with the internet and a decoder, obtaining location information from a web site indicated by a Uniform Resource Locator (URL);
the retrieving system obtaining rule information via the internet from a location indicated by location information, the rule information being indicative of a rule for retrieving a plurality of discarded symbol;
the retrieving system using the rule information obtained to configure the decoder, the rule information comprising a rule for grouping symbols from the sequence of symbols into a plurality of groups of symbols and changing the sequence of the plurality of groups of symbols and obtaining a plurality of group size numbers indicative of the number of symbols in each of the plurality of groups;
the decoder configured to retrieve the information concealed within the sequence of symbols by applying to the sequence of symbols at least one decoder rule determined by the configuration of the decoder.

3. A concealing system for concealing information comprising a sequence of symbols, the system comprising:
A physical network interface in communication with the internet;
a processor comprising an encoder configurable using rule information obtained from a location indicated by location information obtained from a web site indicated by a Uniform Resource Locator (URL), the encoder when configured using the rule information, operable to form concealed information by applying to the information comprising the sequence of symbols at least one encoder rule defined by the configuration of the encoder, the rule information being indicative of a rule for discarding a plurality of symbols, the processor being configured to configure the encoder using the rule information;
wherein the encoder comprises a symbol grouping module arranged to group symbols from the sequence of symbols into a plurality of groups of symbols and changing the sequence of the plurality of groups of symbols; and
wherein the symbol grouping module is arranged to use the rule information to determine a number of symbols in each of the plurality of groups of symbols.

4. A concealing system defined by claim 3 comprising a joining module arranged to join the rule information and the concealed information to form transmittable concealed information for subsequent transmission to a decoder operable to retrieve the rule information from the transmittable concealed information, use the rule information to set at least one decoder rule, and subsequently retrieve the information from the transmittable concealed information using the at least one decoder rule.

5. A concealing system defined by claim 3 wherein the joining module is arranged to put a sequence of other symbols together with the information comprising a sequence of symbols.

6. A concealing system defined by claim 5 wherein the joining module is arranged to dispose the rule information within the other symbols.

7. A concealing system defined by claim 3 comprising a file module for disposing one or more of the transmittable concealed information, the rule information and the rule affecting information in a file for subsequent transmission to and/or access by the decoder.

8. A concealing system defined by claim 3 comprising a location information module arranged to obtain location information indicative of the positions of at least one: the rule information; the rule affecting information; and at least one of the position of a hint of the position of the rule information, and a clue of the position of the rule information.

9. A retrieving system for retrieving information concealed within a sequence of symbols, the system comprising:
a physical network interface in communication with the internet;
a rule information determiner arranged to obtain location information from a web site indicated by a URL and obtain rule information from a location indicated by the location information;
a processor comprising a decoder configurable using the rule information and operable when configured to retrieve the information concealed within the sequence of symbols by applying to the sequence of symbols at least one decoder rule determined by the configuration of the decoder, the rule information being indicative of a rule for retrieving a discarded plurality of symbols, the processor being configured to configure the decoder using the rule information;
wherein the decoder comprises a grouping module arranged to group symbols from the sequence of symbols into a plurality of groups of symbols and changing the sequence of the plurality of groups of symbols; and
wherein the grouping module is arranged to use the rule information to determine a number of symbols in each of the plurality of groups of symbols.

10. A retrieving system defined by claim 9 wherein the grouping module is arranged to operate on symbols of the rule affecting information with symbols of the sequence of symbols to obtain a plurality of group size numbers indicative of the number of symbols in each of the plurality of groups.

11. A retrieving system defined by claim 10 comprising a separation module arranged to separate the plurality of groups from a sequence of other symbols within the sequence of symbols.

12. A retrieving system defined by claim 11 comprising a rule information determiner arranged to determine at least one of: the rule information; and at least one of a hint of the position of the rule information and a clue of the position of the rule information.

13. A retrieving system defined by claim 12 wherein the rule information determiner is arranged to determine the rule information from the sequence of symbols.

14. A retrieving system defined by claim 13 wherein the rule information determiner is arranged to obtain location information indicative of the location of the rule information within the concealed information, and retrieve the rule information from the sequence of symbols using the rule information determiner.

15. A retrieving system defined by claim 9 where at least part of the rule information is determined using fuzzy logic.

16. A method defined by claim 1, where at least part of the rule information is determined using at least one of probabilistic logic, propositional logic, syllogistic logic, hyposyllogistic logic, iterative logic, informal reasoning, fuzzy logic, and many-valued logic.

* * * * *